UNITED STATES PATENT OFFICE.

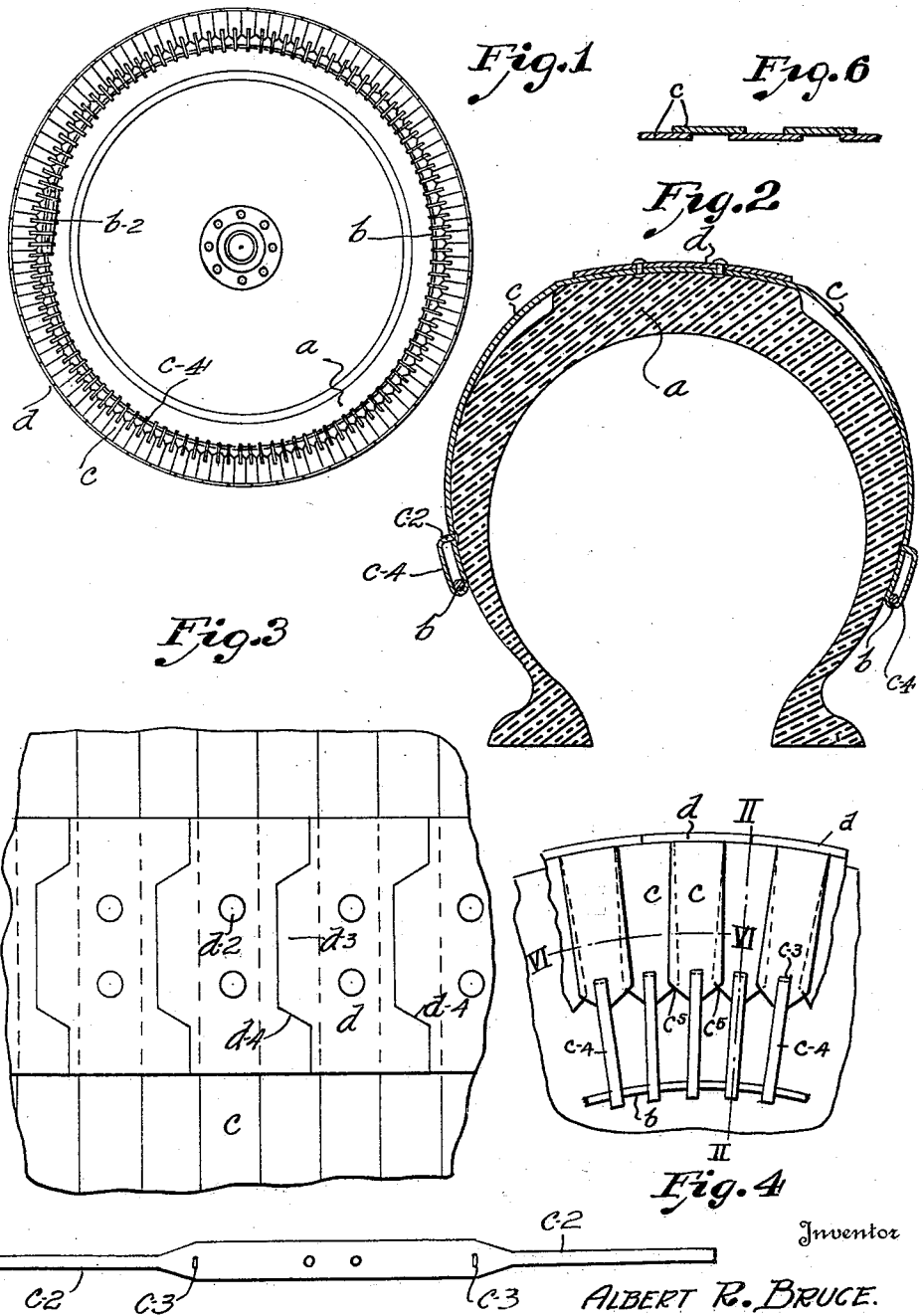

ALBERT R. BRUCE, OF DETROIT, MICHIGAN.

ARMOR FOR PNEUMATIC TIRES.

1,409,522.

Specification of Letters Patent. Patented Mar. 14, 1922.

Application filed April 2, 1921. Serial No. 457,963.

*To all whom it may concern:*

Be it known that I, ALBERT R. BRUCE, citizen of the United States, residing at Detroit, county of Wayne, State of Michigan, have invented a certain new and useful Improvement in Armors for Pneumatic Tires, and declare the following to be a full, clear, and exact description of the same, such as will enable others skilled in the art to which it pertains to make and use the same, reference being had to the accompanying drawings, which form a part of this specification.

My invention relates to tires for automobiles and an object of my improvement is to provide a means for preventing the puncturing and wear of automobile tires, that shall not impair the resiliency of the same and that shall be effective and durable.

In the accompanying drawings:

Figure 1 is the side elevation of a tire with the apparatus embodying my invention attached thereto.

Fig. 2 is a cross-section of the same on the line II—II of Fig. 4.

Fig. 3 is a detailed plan view of a part of the tread of the same.

Fig. 4 is a detailed side elevation of a part of the tire rim and apparatus embodying my invention.

Figure 5 is detailed plan view of one of the transverse strips before it is bent to the shape of the tire, and adjusted to position.

Fig. 6 is a section on the line VI—VI, Fig. 4.

$a$ indicates a pneumatic tire of any usual construction. $b$ $b$ are wires bent into circular shapes to fit around the tire, one upon each side thereof and just below the largest diameter in cross-section of said tire. $b^2$ indicates a turn-buckle by which annular wires $b$ $b$ may be loosened or tightened, or their tension adjusted. These annular wires constitute holding rings.

$c$ indicates strips of steel, each of which has a broad central part which contracts to an extended tongue $c^2$ at each end. $c^3$ are apertures formed through the broader portion of the strip $c$ toward the ends and at the center thereof. The strip $c$ is laid transversely across the tread of the tire $a$, the tongues $c^2$ passing under, around and over the wires $b$ $b$, their ends engaging in the apertures $c^3$, $c^3$ so as to form loops $c^4$ (Fig. 2) engaging the wires $b$ $b$. A series of strips $c$ are thus laid across the tread of the tire and extend all around the tire. The edges of said strip on the tread being contiguous and adjacent strips overlapping each other as shown at $c^5$ in Fig. 4, towards the ends of the broader portions of said strips upon each side of the tread. The wires $b$ $b$ may be adjusted by means of a turn buckle $b^2$ to bring a proper tension of the strips $c$ upon the tread of the tire $a$.

A number of the adjacent strips $c$ are formed with larger loops $c^4$ than the others, so as to engage over the turn-buckle $d^2$.

$d$ indicates plates of the form shown in Fig. 3; that is to say, of a substantially rectangular form but having projecting portions $d^3$ on one side and corresponding recesses $d^4$ upon the other side. The length of these strips is equal to the width of the tread of the tire and the breadth is such that a single strip shall extend over one of the strips $c$ and half way over the adjacent strip upon each side. A strip $d$ is riveted, or welded, to every other strip $c$, the tongues $d^3$ engaging within a recess $d^4$.

By this construction the steel plates $d$ come in contact with the road and cannot be punctured. While each of said plates or a number of adjacent plates will readily yield to the pressure upon the tread following the giving of the tire, and will return to place when the tire again expands after the removal of the deforming force, the flexible strips $c$ follow the variation in form of the tire.

What I claim is:

A tire protector, made flexible by the method of construction, of contiguous metal strips extending transversely of the tread of the tire, each alternate strip overlapping the preceding and following strip on the sides of the tire which prevents them from binding, in combination with an annular wire upon the side and concentric with said tire, said strips engaging said wire at their ends with a loop, made by narrowing the strip two inches or more at the end and bending outwardly from the tire and securely fastening, to hold and prevent tearing of the fabric of the tire, reinforced at the point of contact with the road by a contiguous series of hardened steel plates, fastened to each alternate strip, to take the wear, said plates forming a continuous circle when not depressed.

In testimony whereof I sign this specification.

ALBERT R. BRUCE.